(12) United States Patent
Lee et al.

(10) Patent No.: US 11,906,846 B2
(45) Date of Patent: Feb. 20, 2024

(54) DISPLAY DEVICE AND MANUFACTURING METHOD THEREFOR

(71) Applicant: SAMSUNG ELECTRONICS CO., LTD., Suwon-si (KR)

(72) Inventors: Youngchol Lee, Suwon-si (KR); Hyungsuk Kim, Suwon-si (KR); Naewon Jang, Suwon-si (KR); Seokwoo Yong, Suwon-si (KR); Junsung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/113,359

(22) Filed: Feb. 23, 2023

(65) Prior Publication Data

US 2023/0194927 A1 Jun. 22, 2023

Related U.S. Application Data

(63) Continuation of application No. PCT/KR2021/010206, filed on Aug. 4, 2021.

(30) Foreign Application Priority Data

Sep. 16, 2020 (KR) .................. 10-2020-0119189

(51) Int. Cl.
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133605* (2013.01);
(Continued)

(58) Field of Classification Search
CPC ......... G02F 1/133–133621; G02F 2201/34–36
See application file for complete search history.

(56) References Cited

U.S. PATENT DOCUMENTS 8,294,165 B2 10/2012 Hattori et al.
8,552,454 B2 * 10/2013 Hsieh .................... H01L 33/507
313/506
(Continued)

FOREIGN PATENT DOCUMENTS

CN 106206911 12/2016
CN 109564960 4/2019
(Continued)

OTHER PUBLICATIONS

International Search Report dated Nov. 18, 2021 issued in PCT/KR2021/010206 (2 pages).
(Continued)

*Primary Examiner* — Jason M Han
(74) *Attorney, Agent, or Firm* — Nixon & Vanderhye P.C.

(57) ABSTRACT

A display device according to the disclosure comprises: a liquid crystal panel having a front surface configured to display an image; and a light source plate disposed at the rear of the liquid crystal panel configured to provide light to the liquid crystal panel, wherein the light source plate comprises: a printed circuit board having a mounting surface; an LED chip directly mounted on the mounting surface as a chip on board (COB); a transparent resin disposed on the LED chip to encompass the LED chip; a light conversion layer configured to convert the wavelength of light emitted from the LED chip and encompassing the outer peripheral surface of the transparent resin; and a barrier layer covering the light conversion layer from the outside.

18 Claims, 10 Drawing Sheets

(52) U.S. Cl.
CPC .. *G02F 1/133608* (2013.01); *G02F 1/133612* (2021.01); *G02F 1/133621* (2013.01); *G02F 2201/346* (2013.01); *G02F 2202/36* (2013.01)

(56) References Cited

U.S. PATENT DOCUMENTS

| | | | |
|---|---|---|---|
| 8,916,887 B2 | 12/2014 | Kim | |
| 9,812,617 B2 | 11/2017 | Yoshimura et al. | |
| 9,865,577 B2 | 1/2018 | Bibl et al. | |
| 9,869,897 B2 * | 1/2018 | Liu | G02F 1/133617 |
| 10,128,418 B2 | 11/2018 | Harris | |
| 10,644,207 B2 | 5/2020 | Naasani et al. | |
| 10,948,163 B2 | 3/2021 | Lee | |
| 11,031,532 B2 | 6/2021 | Yamada et al. | |
| 11,112,648 B2 | 9/2021 | Jeon et al. | |
| 11,112,652 B2 * | 9/2021 | Kim | G02F 1/133606 |
| 11,420,412 B2 | 8/2022 | Dubrow et al. | |
| 11,588,077 B2 * | 2/2023 | Tydtgat | H01L 33/005 |
| 2008/0231170 A1 * | 9/2008 | Masato | C09K 11/642 430/23 |
| 2015/0171290 A1 | 6/2015 | Lee et al. | |
| 2016/0103365 A1 | 4/2016 | Sato | |
| 2019/0198730 A1 | 6/2019 | Pickett et al. | |
| 2019/0293970 A1 | 9/2019 | Kim et al. | |

FOREIGN PATENT DOCUMENTS

| | | |
|---|---|---|
| JP | 2007-049019 | 2/2007 |
| JP | 2010-267826 | 11/2010 |
| JP | 2011-198930 | 10/2011 |
| JP | 5423120 | 2/2014 |
| JP | 2018-160646 | 10/2018 |
| JP | 6492492 | 4/2019 |
| JP | 6544076 | 7/2019 |
| KR | 10-2011-0136676 | 12/2011 |
| KR | 10-2012-0005297 | 1/2012 |
| KR | 10-2013-0014256 | 2/2013 |
| KR | 10-1251811 | 4/2013 |
| KR | 10-1504993 | 3/2015 |
| KR | 10-2016-0117083 | 10/2016 |
| KR | 10-2017-0020182 | 2/2017 |
| KR | 10-1724699 | 4/2017 |
| KR | 10-1704334 | 7/2017 |
| KR | 10-2017-0103421 | 9/2017 |
| KR | 10-1937241 | 1/2019 |
| KR | 10-1946921 | 4/2019 |
| KR | 10-2019-0090332 | 8/2019 |
| KR | 10-2041247 | 11/2019 |
| KR | 10-2020-0027270 | 3/2020 |
| KR | 10-2094829 | 3/2020 |
| KR | 10-2098682 | 5/2020 |

OTHER PUBLICATIONS

Written Opinion dated Nov. 18, 2021 issued in PCT/KR2021/010206 (4 pages).

* cited by examiner

DISPLAY DEVICE AND MANUFACTURING METHOD THEREFOR

CROSS-REFERENCE TO RELATED APPLICATIONS

This application is a continuation of International Application No. PCT/KR2021/010206 designating the United States, filed on Aug. 4, 2021, in the Korean Intellectual Property Receiving Office and claiming priority to Korean Patent Application No. 10-2020-0119189, filed on Sep. 16, 2020, in the Korean Intellectual Property Office, the disclosures of which are incorporated by reference herein in their entireties.

BACKGROUND

Field

The disclosure relates to a display device having a backlight unit.

Description of Related Art

A display device is an output apparatus which is capable of visually displaying data information, such as characters, figures, etc., and images, and includes televisions, various monitors, various portable terminals (e.g., laptop computers, tablet personal computers (PCs) and smartphones), and the like.

Display devices are classified into an emissive type that uses a self-emissive display panel, such as organic light emitting diodes (OLEDs), and a non-emissive type that uses a display panel unable to emit light by itself and requiring light from a backlight unit, such as a liquid crystal display (LCD) panel.

Backlight units are classified based on the position of a light source into a direct type with light sources positioned behind a display panel and an edge type with light sources positioned along edges of a display panel. A direct type backlight unit may include a light source plate with light emitting diodes (LEDs) mounted on a plate-shaped printed circuit board (PCB).

Recently, display devices improve color reproducibility of light emitted from a light source through quantum dots (QDs). In the conventional technology, a QD sheet provided at a rear side of a display panel is used to implement the above, but there is a cost rise and limitation in assembly of the display device.

SUMMARY

Embodiments of the disclosure provide a display device having an improved structure to enhance color reproducibility.

Embodiments of the disclosure provide a display device capable of maintaining color reproducibility while minimizing and/or reducing a quantum dot conversion member without using a quantum dot sheet.

A display device according to an example embodiment of the disclosure includes: a liquid crystal panel having a front side configured to display an image; and a light source plate disposed behind the liquid crystal panel configured to provide the liquid crystal panel with light, wherein the light source plate includes: a printed circuit board (PCB) having a mounting surface; a light emitting diode (LED) chip directly mounted on the mounting surface in a Chip On Board (COB) manner; a transparent resin disposed on the LED chip and substantially surrounding the LED chip; a light conversion layer configured to convert a wavelength of light emitted from the LED chip, the light conversion layer substantially surrounding an outer surface of the transparent resin; and a barrier layer covering the light conversion layer from an outside.

In addition, the light conversion layer may include quantum dot particles configured to convert a wavelength of light emitted from the LED chip.

The LED chip may be configured to emit blue-based light, wherein the light conversion layer may include a red quantum dot configured to convert blue-based light into red-based light and a green quantum dots configured to convert blue-based light into green-based light.

The transparent resin may have a dome shape formed on the mounting surface while having the LED chip disposed therein.

The LED chip may include a light emitting surface formed on a side facing the liquid crystal panel, and configured to emit light, and a region of the outer circumferential surface of the transparent resin provided at a position corresponding to the light emitting surface in a direction the light emitting surface faces may be spaced apart from the light emitting surface.

The light source plate further may include an auxiliary light conversion layer formed on the mounting surface inside the transparent resin and configured to convert a wavelength of light emitted from the LED chip.

The auxiliary light conversion layer may include a fluorescent material.

The auxiliary light conversion layer may be provided to be coated on the mounting surface.

The LED chip may be configured to emit blue-based light, and the fluorescent material may be configured to convert blue-based light into red and green-based light.

The light source plate may further include a Distributed Bragg reflector (DBR) layer disposed on the light emitting surface such that light emitted from the light emitting surface may have a greater light directivity angle with respect to the liquid crystal panel.

The barrier layer may comprise a silicone or epoxy resin.

The light conversion layer may substantially surround the transparent resin by being dispensed on the transparent resin.

The barrier layer may have a size corresponding to a size of the printed circuit board, and may substantially surround the light conversion layer through bonding to the printed circuit board in a direction in which the mounting surface of the printed circuit board may face.

The barrier layer may have a size corresponding to a size of the printed circuit board, and may substantially surround the transparent resin through bonding to the printed circuit board in a direction in which the mounting surface of the printed circuit board may face.

The light conversion layer and the barrier layer may each have a size corresponding to a size of the printed circuit board, and overlapping and matching with each other in a direction in which the mounting surface of the printed circuit board faces, and bonded to the printed circuit bound in a direction in which the mounting surface of the printed circuit board may face.

A display device according to an example embodiment of the disclosure includes: a liquid crystal panel having a front side configured to display an image; and a light source plate disposed behind the liquid crystal panel configured to provide the liquid crystal panel with light, wherein the light source plate includes: a printed circuit board (PCB) having a mounting surface; a plurality of light emitting diode (LED) chips directly mounted on the mounting surface in a Chip On Board (COB) manner; a plurality of transparent resins each of which is dispensed on a corresponding one of the plurality of LED chips to respectively substantially surround the plurality of LED chips; a plurality of light conversion layers configured to convert wavelengths of light emitted from the plurality of LED chips and each of which is disposed on a corresponding one of the plurality of transparent resins to respectively substantially surround outer circumferential surfaces of the plurality of transparent resins; and a barrier layer having a size corresponding to the printed circuit board and bonded to the printed circuit board in a direction in which the mounting surface of the printed circuit board faces, and substantially surrounding the plurality of light conversion layers.

The plurality of light conversion layers may each include quantum dot particles configured to convert a wavelength of light emitted from the plurality of LED chips.

The light source plate further may include an auxiliary light conversion layer formed on the mounting surface inside the plurality of transparent resins and configured to convert a wavelength of light emitted from the plurality of LED chips.

The light source plate may further include a Distributed Bragg reflector (DBR) layer disposed on each of the plurality of LED chips such that light emitted from each of the plurality of LED chips may have a greater light directivity angle with respect to the liquid crystal panel.

A display device according to an example embodiment of the disclosure includes: a liquid crystal panel having a front side configured to display an image; and a light source plate disposed behind the liquid crystal panel configured to provide the liquid crystal panel with light, wherein the light source plate includes: a printed circuit board (PCB) having a mounting surface; a plurality of light emitting diode (LED) chips directly mounted on the mounting surface in a Chip On Board (COB) manner; a plurality of transparent resins each of which is disposed on a corresponding one of the plurality of LED chips to respectively substantially surround the plurality of LED chips; a plurality of light conversion layers configured to convert wavelengths of light emitted from the plurality of LED chips and each of which is disposed on a corresponding one of the plurality of transparent resins to respectively substantially surround outer circumferential surfaces of the plurality of transparent resins; and a plurality of barrier layers each of which is disposed to a corresponding one of the plurality of light conversion layers to cover the plurality of light conversion layers from outside.

According to various example embodiments of the present disclosure, a light converter including quantum dots for improving color reproducibility is formed on a light source plate, so that slimming of the display device can be possible by omitting a quantum dot sheet.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The various example embodiments described in the present disclosure are simply example embodiments of the present disclosure, and various modifications may be made to replace various aspects of the various embodiments and drawings of the present disclosure.

The singular form is intended to include the plural form as well, unless the context clearly indicates otherwise. In the accompanying drawings, the size and relative sizes of elements may be exaggerated for clarity and/or descriptive purposes.

It is to be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Figure 1:
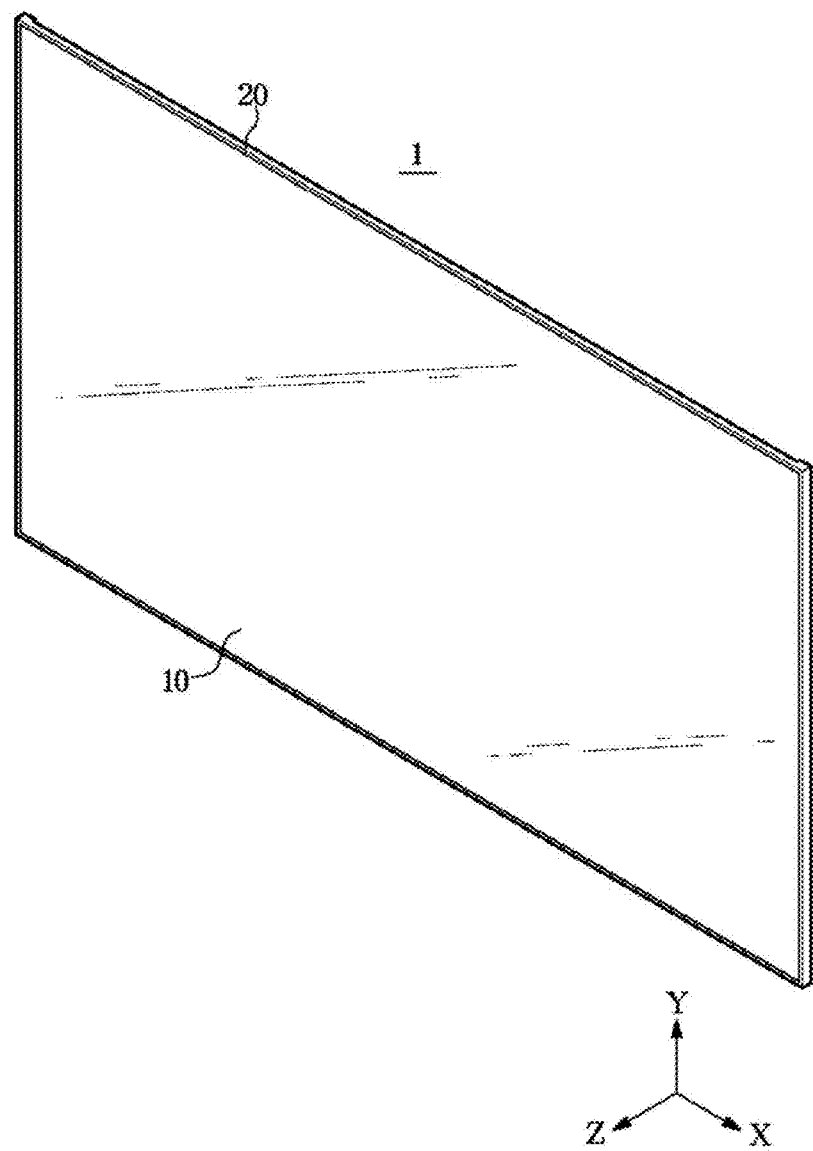
FIG. 1 is a perspective view illustrating an external appearance of a display device according to various embodiments.

The directions of "front", "rear", "upper", "lower", "left" and "right" are based on the directions illustrated in FIG. 1 of the accompanying drawings throughout the disclosure. In FIG. 1, the X-axis, Y-axis, and Z-axis directions perpendicular to each other are illustrated, the X-axis direction represents the direction of a long side 11 of a liquid crystal panel 10, the Y-axis direction represents the direction of a short side 12 of the liquid crystal panel 10, and the Z-axis direction represents the front-back direction.

Hereinafter, various example embodiments according to the disclosure will be described in greater detail with reference to the accompanying drawings.

Figure 2:
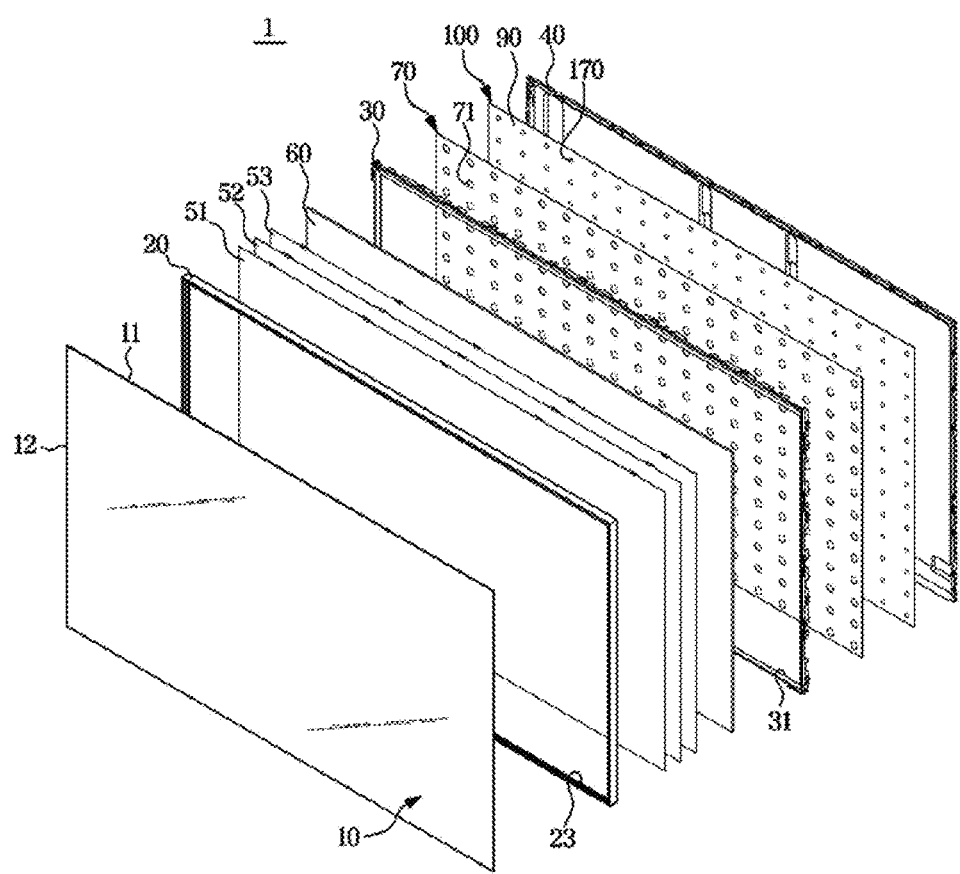
FIG. 2 is an exploded perspective view illustrating a display device according to various embodiments.
Figure 3:
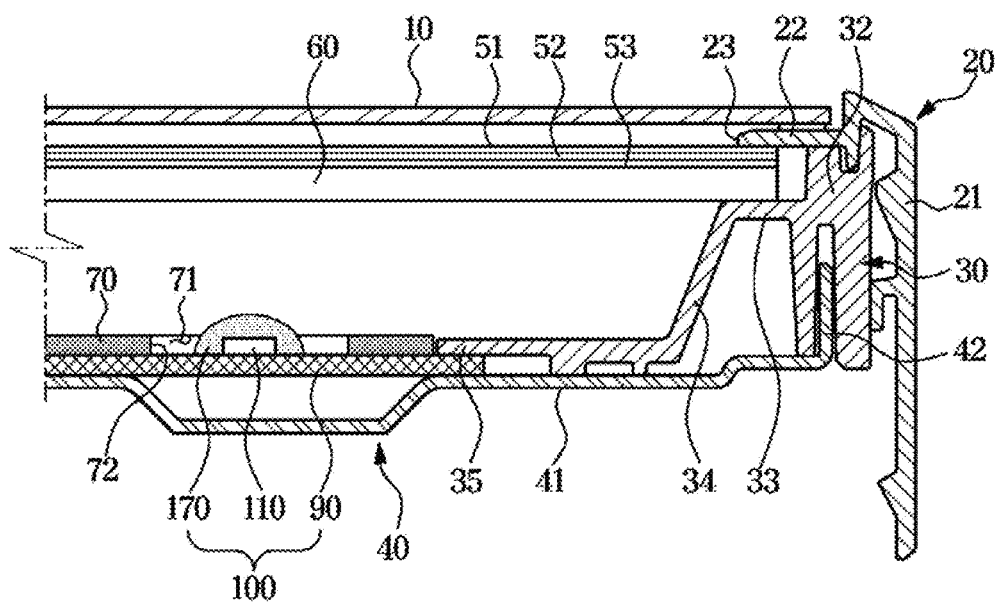
FIG. 3 is a partial cross-sectional view illustrating a display device according to various embodiments.
Figure 4:
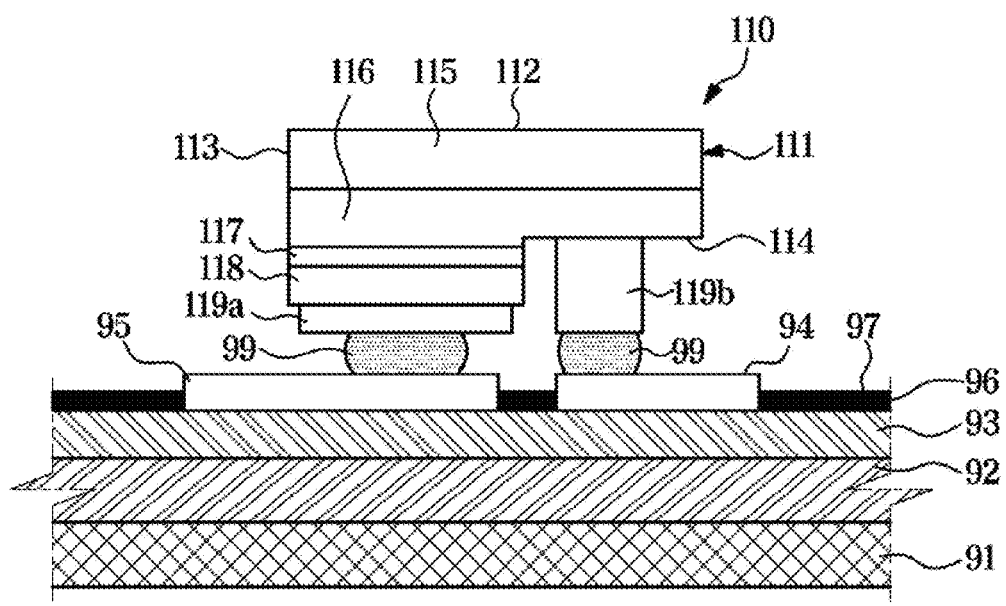
FIG. 4 is a cross-sectional view illustrating a structure in which a light emitting diode (LED) of a display device is mounted on a printed circuit board (PCB) according to various embodiments.

FIG. 1 is a perspective view illustrating an external appearance of a display device according to various embodiments. FIG. 2 is an exploded perspective view illustrating a display device according to various embodiments. FIG. 3 is a partial cross-sectional view illustrating a display device according to various embodiments. FIG. 4 is a cross-sectional view illustrating a structure in which a light emitting diode (LED) of a display device is mounted on a printed circuit board (PCB) according to various embodiments.

Referring to FIGS. 1, 2, 3 and 4 (which may be referred to as FIGS. 1 to 4), a display device 1 includes a liquid crystal panel 10 for displaying an image, a backlight unit disposed behind the liquid crystal panel 10 to provide light to the liquid crystal panel 10, and a chassis assembly supporting the backlight unit and the liquid crystal panel 10.

The chassis assembly includes a rear chassis 40 provided to support the backlight unit, a front chassis 20 provided in front of the rear chassis 40 to support the liquid crystal panel 10, and a middle mold 30 coupled between the front chassis 20 and the rear chassis 40.

The liquid crystal panel 10 may include a thin film transistor substrate in which thin film transistors are provided in the form of a matrix, a color filter substrate coupled to the thin film transistor substrate in parallel with the thin transistor substrate, and liquid crystal injected between the TFT substrate and the color filter substrate and having optical properties varied based on a change in voltage or temperature.

The backlight unit may be disposed behind the liquid crystal panel 10 to transmit light to the liquid crystal panel 10. The backlight unit may include a light source plate 100 including a printed circuit board 90 on which light emitting diode (LED) chips, which are light sources 110, are mounted and optical members arranged along a path of the light emitted from the light source plate 100.

The light source plate 100 may have a flat panel shape. The light source plate 100 may be disposed in parallel with the liquid crystal panel 10.

The light source plate 100 may include a printed circuit board 90, a plurality of LED chips 110 mounted on a surface facing the liquid crystal panel 10 of the printed circuit board 90, and a plurality of transparent resins 120, light conversion layers 130 and barrier layers 140 each of which is formed to substantially surround (as used herein, the term "surround" may include "substantially surround" and is not limited to "completely surround") a corresponding one of the plurality of LED chips 110 to protect the LED chip 110 and increase light efficiency. For the sake of convenience of description, when referring to all of the plurality of transparent resins 120, the plurality of light conversion layers 130, and the plurality of barrier layers 140, they may be referred to as a plurality of covers 170. The plurality of covers 170 will be described in greater detail below.

The optical members may be disposed on a movement path of the light emitted from the LED chips 110 to guide the traveling direction of the light, reflect the light, diffuse the light, or improve optical characteristics.

The optical members may include a reflector sheet 70 for reflecting light to prevent and/or reduce light loss, a diffuser plate 60 for evenly diffusing irregular light emitted from the light source plate 80, a quantum dot sheet 53 for improving color reproducibility by changing the wavelength of light, and optical sheets 51 and 52 for enhancing optical characteristics.

The reflector sheet 70 may reflect light emitted from the light source plate 80 or light exiting the diffuser plate 60 backward to be directed to the diffuser plate 60. The reflector sheet 90 may be disposed in front of the light source plate 80 while in close contact with the light source plate 80.

The reflector sheet 90 may have openings 91 formed at positions corresponding to the plurality of LED chips 110. Each of the plurality of LED chips 110 may be disposed inside a corresponding one of the openings 71. Each of the plurality of LED chips 110 may be disposed at a distance away from an inner circumferential surface 72 of the corresponding opening 71. Accordingly, the light emitted from the plurality of LED chips 110 is prevented/reduced from being blocked by the inner circumferential surface 72 of the opening 71 and the light directivity angle may be increased.

The diffuser plate 60 may uniformly diffuse the light emitted from the light source plate 100 and support the optical sheets 51, 52, and 53. The diffuser plate 60 may uniformly diffuse the light incident onto an incident surface thereof and exit the light through an exit surface thereof.

The optical sheets 51, 52, and 53 may be disposed in front of the diffuser plate 60 to improve optical characteristics of light exiting the diffuser plate 60. The optical sheets 51, 52 and 53 may include a diffuser sheet for offsetting a pattern of the diffuser plate 60, a prism sheet for improving brightness by concentrating light, a protection sheet for protecting other optical sheets against an external shock or inflow of foreign materials, a reflective polarizing sheet (e.g., a dual brightness enhancement film (DBEF)) for transmitting one polarization while reflecting another polarization to enhance brightness, and the like.

The rear chassis 40 may be arranged behind the backlight unit. The rear chassis 40 may have a plate shape that is bent approximately at a rim portion. The backlight unit may be accommodated between the rear chassis 40 and the front chassis 20.

The rear chassis 40 may include a rear base portion 41 on which the light source plate 80 is installed and rear-side portions 42 formed on the upper, lower, left and right edges of the rear chassis 40 to be coupled to the middle mold 30.

The rear chassis 40 may serve to dissipate heat generated from a heating element, such as the plurality of LED chips 110, and the like to the outside. To this end, the rear chassis 40 may be formed of aluminum, various types of metals, such as stainless steel, or plastics such as acrylonitrile butadiene styrene (ABS).

The front chassis 20 may be provided in a frame shape having an opening 23 that allows light from the backlight unit to be provided to the liquid crystal panel 10. The front chassis 20 may include a front-side portion 21 formed on the upper, lower, left and right edges of the front chassis 20 to be coupled to the middle mold 30 and a panel support portion 22 protruding inward from the front-side portion 21 to support the liquid crystal panel 10.

The middle mold 30 may support the diffuser plate 60 and reflect light emitted from the light source plate 100 to the diffuser plate 60. The middle mold 30 may maintain a distance between the diffuser plate 60 and the light source plate 100. The middle mold 30 may be coupled between the front chassis 20 and the rear chassis 40.

The middle mold 30 may be provided in a frame shape having an opening 31. The middle mold 30 may include a frame portion 32 to which the front chassis 20 and the rear chassis 40 are coupled, a diffuser plate support portion 33 protruding inward from the frame portion 32 to support the diffuser plate 60, a reflector portion 34 extending from the diffuser plate support portion 33 to reflect light, and a substrate support portion 35 extending from the reflector portion 34 to support a substrate 102.

The frame portion 32 may be disposed on upper, lower, left, and right edges of the middle mold 30. The frame portion 32 may be coupled to the front chassis 20 and the rear chassis 40 in various known fitting structures and with separate fastening members.

The diffuser plate support portion 33 may protrude inward from the frame portion 32 to support the diffuser plate 60. The diffuser plate support portion 33 may support edges of the incident surface of the diffuser plate 60. The diffuser plate support portion 33 may be formed in parallel with the base portion 41 of the rear chassis 40.

The reflector portion 34 may reflect the light emitted from the light source plate 80 to the incident surface of the diffuser plate 44. The reflector portion 34 may extend obliquely inward from the diffuser plate support portion 33.

The substrate support portion 35 may fix the printed circuit board 90 of the light source plate 80 not to be lifted from the base portion 41 of the rear chassis 40. The substrate support portion 35 may be formed at an inner end portion of the reflector portion 34. The edge of the printed circuit board 90 of the light source plate 100 may be supported between the substrate support portion 35 and the base portion 41.

The frame portion 32, the diffuser plate support portion 33, the reflector portion 34, and the substrate support portion 35 of the middle mold 30 may be integrally formed with each other. A highly reflective material may be coated on the surface of the middle mold 30. The highly reflective material may be coated on the entire surface of the middle mold 30, or may be coated only on the surface of the reflector portion 34. The entire area or the reflector portion 34 of the middle mold 30 may have a white color to effectively reflect light.

The printed circuit board 90 of the light source plate 100 may include a base 91, a power wiring layer 93 including a metal wiring (not shown), an insulation layer 92 formed between the base 91 and the power wiring layer 93, and a photo solder resist (PSR) layer 96 formed on the power wiring layer 93 to protect the pattern of the power wiring layer 93 and enhance light efficiency.

The base 91 may be provided using any type of substrate as long as it can form the frame of the light source plate 80 and apply a voltage to the LED chip 110 through the power wiring layer 93. For example, the base 91 may be formed of FR-4, ceramic, polyimide, polyethylene terephthalate (PET), glass, or the like.

The metal wiring of the power wiring layer 93 may be formed by patterning a conductive material on the base 91.

The insulation layer 92 may be positioned between the base 91 and the power wiring layer 93 to electrically insulate between the base 91 and the metal wiring of the power wiring layer 93.

The PSR layer 96 may be formed by applying a photo solder resist (PSR) ink on the power wiring layer 93.

A plurality of LED chips 110 may be mounted on the printed circuit board 90. The plurality of LED chips 110 may be mounted to have a predetermined distance from each other. The plurality of LED chips 110 may be mounted in a matrix form on the printed circuit board 90.

The printed circuit board 90 may include a mounting surface 97 which forms the uppermost surface and on which the plurality of LED chips 110 are mounted. The PSR layer 96 may form a part of the mounting surface 97.

Since the plurality of LED chips 110 are each formed in the same form, the following description is made in relation to a single LED chip 110.

The LED chip 110 may not only be provided as an LED of a general size, but may also be provided as a mini LED having a size of several hundreds of μm or a micro LED having a size of several μm to several tens of μm.

The LED chip 110 may be provided to emit blue-based light. The LED chip 110 may be formed as at least one of a blue quantum dot (Blue QD)-based electroluminescent device, a blue fluorescent-based electroluminescent device, a blue thermally activated delayed fluorescent-based electroluminescent device, and a blue phosphorescent-based electroluminescent device. Details thereof will be described below.

The LED chip 110 may be directly mounted on the printed circuit board 90 in, for example, a Chip On Board (COB) method. The LED chip 110 may be an inorganic light emitting device. The inorganic light emitting devices may be manufactured by growing a thin film of inorganic materials, such as aluminum (AL), gallium (Ga), nitrogen (N), phosphorus (P), arsenic (As), or indium (In) on a sapphire, gallium arsenide (GaAs) or silicon (Si)-based base substrate.

The LED chip 110 may be picked up from the base substrate and directly transferred onto the printed circuit board 90. The LED chip 110 may be picked up and transported through an electrostatic method using an electrostatic head or a bonding method using an elastic polymer material having elasticity, such as Polydimethylsiloxane (PDMS) or silicon, as a head.

The LED chip 110 may be a flip chip type LED including: a device body 111 having a light emitting surface 112 forming the upper surface and through which light emitted from the LED chip 110 is emitted, at least one side surface 113, and a bottom surface 114; and device electrodes 119*a* and 119*b* formed on the bottom surface 114 of the device body 111. The LED chip 110 may have a substantially hexahedral shape, and the at least one side surface 103 may include four side surfaces.

Such a flip-chip type LED may be directly mounted on the printed circuit board 90 through the device electrodes 119*a* and 119*b* formed on the bottom surface 114 without a separate connection structure, such as a metal lead or a wire. Accordingly, the efficiency of the manufacturing process is high and there is a benefit in the miniaturization and weight reduction of the LED chip 110. In addition, since the device electrodes 119*a* and 119*b* are positioned on a side in a direction opposite to the light emission direction of the LED chip 110, the light emission efficiency of the LED 100 may be improved.

However, the LED chip 110 may be provided using a lateral chip type LED in which device electrodes are spaced apart from each other and two wires are required, or a vertical chip type LED in which device electrodes are disposed to vertically overlap each other and one wire is required.

The LED chip 110 may include a growth substrate 115, an n-type semiconductor layer 116, an active layer 117, a p-type semiconductor layer 118, an n-type device electrode 119*b*, and a p-type device electrode 119*a*.

The growth substrate 115 may be provided using a sapphire substrate that is useful as a substrate for nitride semiconductor growth, but is not limited thereto, and may be provided using various substrates provided for semiconductor single crystal growth, such as a silicon substrate, a GaN substrate, and the like.

The N-type semiconductor layer 116, the active layer 117, and the p-type semiconductor layer 118 may be formed of a nitride semiconductor. The active layer 117 may serve as a light emitting layer that emits light at a magnitude corresponding to the band gap energy thereof by recombination of electrons and holes.

The N-type device electrode 119*b* and the P-type device electrode 119*a* may be formed of a material capable of ohmic contact with a nitride semiconductor, for example, may be formed of a metal, such as silver (Ag) or aluminum (Al).

The printed circuit board 90 may have an n-type substrate electrode 94 and a p-type substrate electrode 95 to correspond to the n-type device electrode 119*b* and the p-type device electrode 119*a*, respectively. The n-type device electrode 119*b* and the p-type device electrode 119*a* may be electrically connected to the n-type substrate electrode 94 and the p-type substrate electrode 95, respectively, by solder bumps 99.

However, the n-type device electrode 119*b* and the p-type device electrode 119*a* may be electrically connected to the n-type substrate electrode 94 and the p-type substrate electrode 95 by an anisotropic conductive film. The anisotropic conductive film is a film having a structure in which conductive balls are dispersed in an adhesive resin, and when pressure is applied to the conductive balls, a thin insulating film surrounding the conductive spheres is broken and the conductive spheres allow the electrodes to be electrically connected.

Hereinafter, the plurality of transparent resins 120, the plurality of light conversion layers 130, and the plurality of barrier layers 140 of the light source plate 100 will be described in greater detail.

Figure 5:
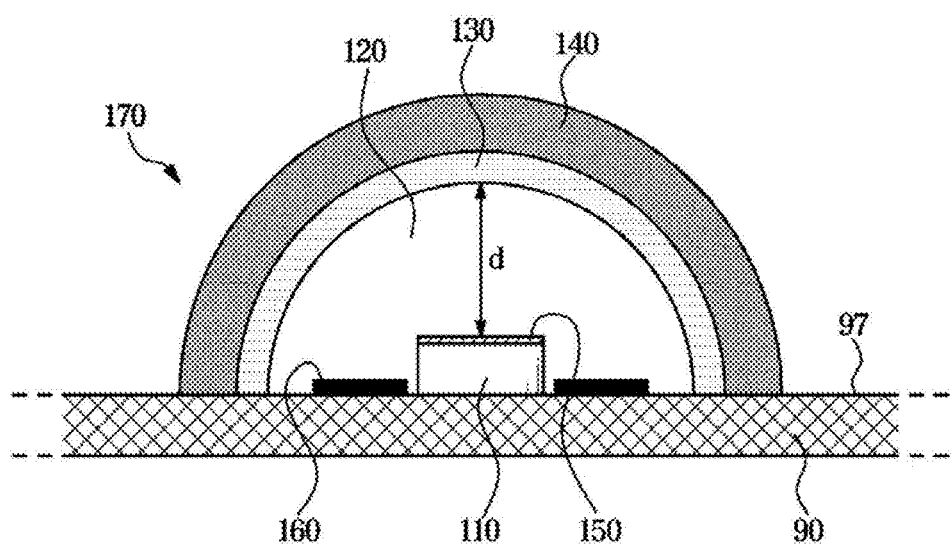
FIG. 5 is a cross-sectional view illustrating a partial configuration of a light source plate of a display device according to various embodiments.
Figure 6:
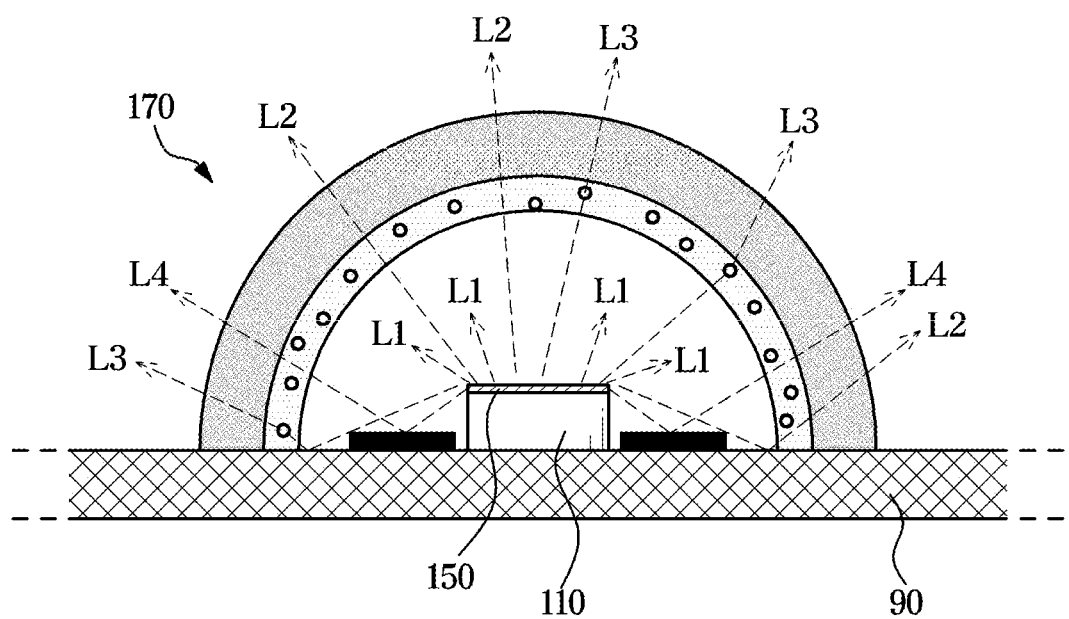
FIG. 6 is a diagram illustrating light emission of an LED chip in FIG. 5 according to various embodiments.

FIG. 5 is an cross-sectional view illustrating an example partial configuration of a light source plate of a display device according to various embodiments, and FIG. 6 is a cross-sectional view illustrating light emission from an LED chip in FIG. 5 according to various embodiments.

In the case of a conventional display device, a quantum dot sheet for changing the wavelength of light emitted from the light source is included to improve color reproducibility of the light emitted from the light source.

The quantum dot sheet is disposed to have a predetermined distance from the light source inside the display device to be prevented/reduced from being thermally deformed due to heat generated from the light source, and is disposed together with an additional protective film to prevent and/or reduce moisture from penetrating from the outside.

Accordingly, the color reproducibility of the display device is increased and the performance of the display device is improved, but the thickness of the display device increases according to the arrangement of the quantum dot sheet inside the display device, and the quantum dot sheet and the protective film of the quantum dot sheet cause the production cost to rise.

In order to address the above issue, a display device including a light source in which a configuration having quantum dots is directly installed on an LED package instead of using a quantum dot sheet has been developed. However, as the configuration having quantum dots is installed on the LED package, there is another issue that heat generated from the LED chip and external moisture may lower the reliability of the configuration having quantum dots.

In order to address the above-described issue, the display device 1 according to an embodiment of the disclosure may include a configuration capable of improving the reliability of a configuration having quantum dots against the heat and moisture without having a quantum dot sheet.

For example, the light source plate 100 may include a plurality of transparent resins 120 formed to surround the plurality of LED chips 110 by dispensing to the plurality of LED chips 110, a plurality of light conversion layers 130 for converting wavelengths of light emitted from the plurality of LED chips 110 and provided to substantially surround the outer circumferential surfaces of the plurality of transparent resins 120, respectively, and a plurality of barrier layers 140 provided to cover the outer circumferential surfaces of the plurality of light conversion layers 130 to respectively protect the plurality of light conversion layers 130 from the outside.

The plurality of transparent resins 120 are provided to be the same as or similar to each other, the plurality of light conversion layers 130 are provided to be the same as or similar to each other, and the plurality of barrier layers 140 are provided to be the same as or similar to each other. However, the disclosure is not limited thereto. For the sake of convenience of description, they will be hereinafter referred to as the transparent resin 120, the light conversion layer 130, and the barrier layer 140. In addition, the plurality of LED chips 110 are also referred to as the LED chip 110.

The transparent resin 120 may be formed to surround the LED chip 110 to protect the LED chip 110 while increasing the light efficiency.

The transparent resin 120 may be formed by dispensing a liquid molding material onto the LED chip 110 and curing the liquid molding material. The transparent resin 120 may be a silicone or epoxy resin, and when dispensed on the LED chip 110, may be spread by the gravity to thereby surround the LED chip 110. Accordingly, the transparent resin 120 may have a substantially dome shape, and may be formed to be in contact with at least the light emitting surface 112 and the side surface 113 of the LED chip 110.

In addition, the transparent resin 120 may be provided to cover the mounting surface 97 adjacent to the LED chip 110.

The transparent resin 120 may be provided such that a predetermined (e.g., specified) distance d is generated between an outer circumferential surface of the transparent resin 120 and the light emitting surface 112 in a direction in which the light emitting surface 112 of the LED chip 110 faces. This is to allow the light conversion layer 130 to be disposed such that a predetermined distance d is formed between the light conversion layer 130, which will be described below, and the light emitting surface 112 of the LED chip 110.

In addition, in the display device 1 according to an embodiment of the disclosure, light emitted from the LED chip 110 disposed at the rear side of the liquid crystal panel 10 may be directly applied to the liquid crystal panel 10.

In this case, in the liquid crystal panel 10, the amount of light may be concentrated on a region of the liquid crystal panel 10 positioned perpendicular to the light emitting surface 112 of the LED chip 110, and thus the brightness of the liquid crystal panel 10 may become less uniform.

In this case, since the transparent resin 120 according to an embodiment of the disclosure is provided in a dome shape on the LED chip 110, the light directivity angle of the light emitted from the light emitting surface 112 may be widened.

For example, according to the predetermined distance d between the outer circumferential surface of the transparent resin 120 and the light emitting surface 112 in the direction in which the light emitting surface 112 of the LED chip 110 faces, the light directivity angle of light may be easily adjusted.

The light conversion layer 130 including quantum dots may be disposed on the outer circumferential surface of the transparent resin 120.

When a resin having a plurality of quantum dots is dispensed on the transparent resin 120, the light conversion layer 130 may be spread by the gravity to thereby surround the transparent resin 120.

The plurality of quantum dots disposed on the light conversion layer 130 may convert the wavelength of a portion of blue-based light L1 emitted from the LED chip 110 to a mixed light L3 of green-based light and red-based light or a yellow-based light L3 (wavelength shift).

A quantum dot may refer, for example, to a semiconductor crystal formed by gathering hundreds to thousands of atoms. The size of the quantum dots may be, for example, between several nanometers and several tens of nanometers. As such, since the quantum dot has a very small size, a quantum confinement effect occurs. The quantum confinement effect is that when a particle is very small, electrons in the particle form a discontinuous energy state by the outer wall of the particle, and as the space within the particle is smaller, the energy state of electrons become higher and the energy band gap become wider. According to the quantum confinement effect, quantum dots, when irradiated with light such as ultraviolet light or visible light, generate light of various wavelengths. In this case, the quantum dots scatter the incident light to emit light.

The length of the wavelength of light generated from the quantum dots may depend on the size of the particle. For example, when light having a wavelength greater than the energy band gap is incident onto the quantum dot, the quantum dot is excited by absorbing the energy of the light, and then transits to a ground state while emitting light of a specific wavelength. In this case, as the size of the quantum dot is smaller, light of a shorter wavelength, for example, blue-based light or green-based light may be generated, and as the size of the quantum dot is larger, light of a longer wavelength, for example, red-based light may be generated. Therefore, light of various colors may be implemented according to the size of the quantum dot.

A quantum dot particle capable of emitting green-based light according to incidence of light is referred to as a green quantum dot, and a quantum dot particle capable of emitting red-based light according to incidence of light is referred to as a red quantum dot, a plurality of quantum dots may include a green quantum dot and a red quantum dot.

As blue light L1 collides with the green quantum dots and the red quantum dots, the blue light L1 may be converted into a mixed light L3 of green-based light and a red-based light, or a yellow light L3.

The yellow light L3 may pass through the light conversion layer 130 and then proceed to the liquid crystal panel 10.

In addition, another portion of the blue light L1 emitted from the LED chip 110 may not collide with the plurality of quantum dots disposed on the light conversion layer 130 but may pass through the light conversion layer 130 while remaining in a state of blue-based light L2.

Accordingly, a mixed light of the blue-based light L2 and the yellow-based light L3, of which the wavelength of the light has been converted, may pass through the light conversion layer 130, proceeding to the liquid crystal panel 10, and thus the light having an improved color reproducibility may be transmitted to the liquid crystal panel 10 without an additional configuration of a quantum dot sheet.

The light conversion layer 130 may be formed on the outer circumferential surface of the transparent resin 120. As described above, a predetermined distance d is formed between the light emitting surface 112 and the outer circumferential surface of the transparent resin 120, and thus a minimum predetermined distance d between the light conversion layer 130 and the light emitting surface 112 may be formed.

Accordingly, the amount of heat transferred to the light conversion layer 130 that is generated from the light emitting surface 112 may be reduced, so that the reliability of the light conversion layer 130 may be improved.

The barrier layer 140 surrounding the light conversion layer 130 may be disposed on the outer circumferential surface of the light conversion layer 130 to protect the light conversion layer 130 from the outside.

When a resin of the barrier layer 140 is dispensed on the light conversion layer 130, the barrier layer 140 may be spread by the gravity to thereby surround the light conversion layer 130.

Accordingly, the barrier layer 140 may prevent and/or reduce the light conversion layer 130 from being exposed from the outside to protect the light conversion layer 130 from external moisture. Accordingly, the barrier layer 140 may easily protect the light conversion layer 130 without an additional protective film for protecting the light conversion layer 130.

Since the light conversion layer 130 for improving the color reproducibility of the light generated from the LED chip 110 and the barrier layer 140 for protecting the light conversion layer 130 are individually formed on the light source plate 100, slimming of the display device 1 may be easily achieved.

In addition, since the light conversion layer 130 is disposed on the transparent resin 120, the light conversion 130 is prevented/reduced from being thermally deformed by the high temperature heat generated from the LED chip 110.

The light source plate 100 may include a Distributed Bragg reflector (DBR) layer 150 disposed on the light emitting surface 112 to increase the light directivity angle of the light emitted from the light emitting surface 112 with respect to the liquid crystal panel 10.

The DBR layer 150 is a layer, in which a plurality of thin films are stacked, provided to allow light emitted from the light emitting surface 112 to have an increasing light directivity angle with respect to the liquid crystal panel 10 while passing through the plurality of thin films.

In addition, the DBR layer 150 is not limited to the above example and may be provided in another configuration provided to increase the optical directivity angle of the light emitted to the liquid crystal panel 10.

The light source plate 100 may include an auxiliary light conversion layer 160 that is formed on the mounting surface 97 inside the transparent resin 120 and configured to convert the wavelength of the light L1 emitted from the LED chip 110.

The auxiliary light conversion layer 160 may be provided by patterning on the mounting surface 97.

The auxiliary light conversion layer 160 may include a fluorescent material.

A portion of the light emitted from the light emitting surface 112 may be reflected at an inside of the transparent resin 120 and thus directed to the mounting surface 97, on which the light is reflected again to pass through the transparent resin 120.

In this case, the portion of the light directed to the mounting surface 97 may be incident on the auxiliary light conversion layer 16 coated on the mounting surface 97.

The auxiliary light conversion layer 160 may be provided such that the wavelength of light incident on the auxiliary light conversion layer 160 is converted by the fluorescent material of the auxiliary light conversion layer 160.

The auxiliary light conversion layer 160 may be provided such that the blue-based light L1 incident to the auxiliary light conversion layer 160 is converted into a mixed light L4 of green-based light and red-based light by a fluorescent material or into a yellow-based light L4.

The light reflected from the auxiliary light conversion layer 160 passes through the transparent resin 120 and then passes through the light conversion layer 130. In this case, even when the yellow-based light L4 converted through the auxiliary light conversion layer 160 collides with a plurality of quantum dots while passing through the light conversion layer 130, the wavelength of the light is not converted by the plurality of quantum dots.

That is, a portion L4 of the light emitted from the light emitting surface 112 is incident onto the light conversion layer 130 in a state of being pre-converted by the auxiliary light conversion layer 160, and thus the amount of the wavelength of light converted in the light conversion layer 130 may be reduced.

When the light L1 emitted from the LED chip 110 is converted by a plurality of quantum dots, light energy and thermal energy are released. When the amount of light L1 converted by the plurality of quantum dots increases, the amount of heat internally generated by the light conversion layer 130 increases, and thus the thermal reliability of the light conversion layer 130 may be lowered.

However, since the light source plate 100 according to an embodiment of the disclosure includes the auxiliary light conversion layer 160 and the amount of light converted in the light conversion layer 130 may be reduced due to the auxiliary light conversion layer 160, so that thermal reliability of the light conversion layer 130 may be improved.

Hereinafter, an example method of manufacturing a display device 1 according to various will be described in brief.

A printed circuit board 90 on which an auxiliary light conversion layer 160 is patterned is prepared.

A plurality of LED chips 110 are mounted on the printed circuit board 90 in a COB method. However, the disclosure is not limited thereto, and the auxiliary light conversion layer 160 may be patterned after the plurality of LED chips 110 are mounted on the printed circuit board 90.

A transparent resin 120 is dispensed to each of the plurality of LED chips 110, to form a plurality of transparent resins 120 surrounding the plurality of LED chips 110, respectively.

A light conversion layer 130 is dispensed on each of the plurality of transparent resins 120 to form a plurality of light conversion layers 130 surrounding the plurality of transparent resins 120, respectively.

A barrier layer 140 is dispensed on each of the plurality of light conversion layers 130 to form a plurality of barrier layers 140 surrounding the plurality of light conversion layers 130, respectively.

Accordingly, the plurality of transparent resins 120, the plurality of light conversion layers 130, and the plurality of barrier layers 140 may individually cover the plurality of LED chips 110 in an overlapping manner.

For example, in the plurality of LED chips 110, a plurality of covers 170 respectively covering the individual LED chips 110 include the plurality of transparent resins 120, the plurality of light conversion layers 130, and the plurality of barrier layers 140.

Hereinafter, a display device 1 according to various embodiments of the disclosure will be described. Configurations other than a barrier layer 140' described below are the same as or similar to those of the display device 1 according to various embodiments of the disclosure described above, and thus the same descriptions may not be repeated.

Figure 7:
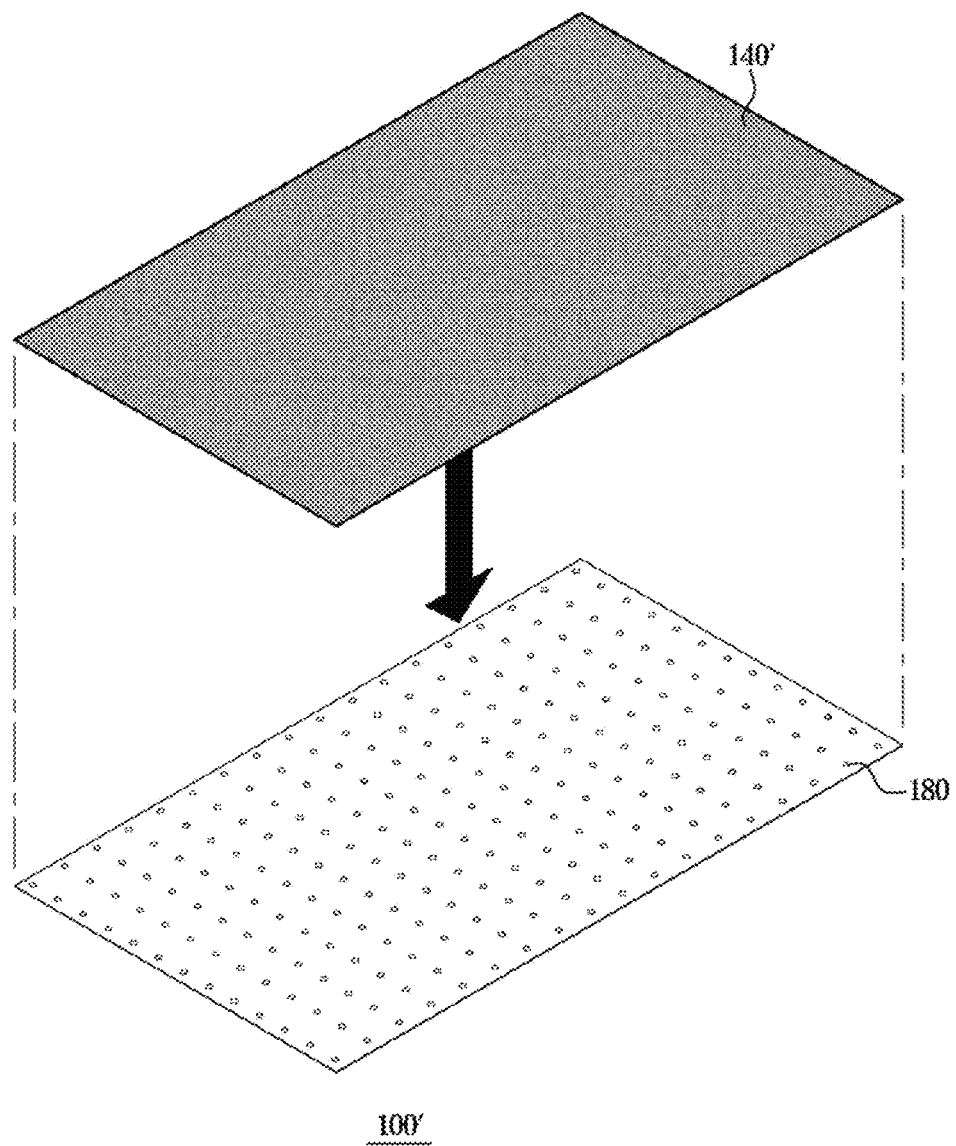
FIG. 7 is an exploded perspective view illustrating an example partial configuration of a light source plate of a display device according to various embodiments.
Figure 8:
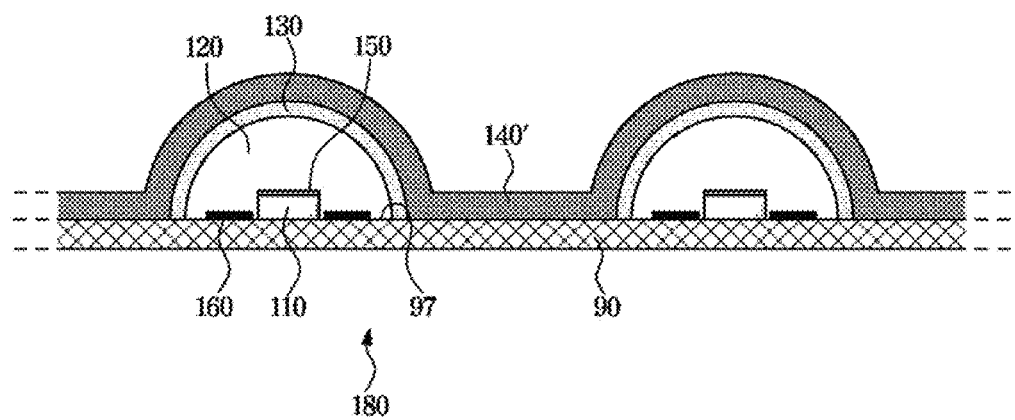
FIG. 8 is an cross-sectional view illustrating an example partial configuration of a light source plate of a display device according to various embodiments.

FIG. 7 is an exploded perspective view illustrating a partial configuration of a light source plate of a display device according to various embodiments. FIG. 8 is an enlarged cross-sectional view illustrating a partial configuration of a light source plate of a display device according to various embodiments.

Referring to FIGS. 7 and 8, a barrier layer 140' may be provided to have a size corresponding to that of the printed circuit board 90, and formed to surround the plurality of light conversion layers 130 through bonding with the printed circuit board 90 in a direction in which the mounting surface 97 of the printed circuit board 90 faces.

For example, in the case of the light source plate 100 of the display device 1 according to the embodiment of the disclosure, the plurality of covers 170 individually covering the plurality of LED chips 110 include the plurality of transparent resins 120, the plurality of light conversion layers 130, and the plurality of barrier layers 140.

However, in the case of a light source plate 100' of the display device 1 according to an embodiment of the disclosure, a plurality of covers 180 individually covering a plurality of LED chips 110 include a plurality of transparent resins 120 and a plurality of light conversion layers 130, and the plurality of covers 180 may be covered by a single barrier layer 140'.

Hereinafter, an example method of manufacturing the display device 1 according to various embodiments will be described in brief.

A printed circuit board 90 on which an auxiliary light conversion layer 160 is patterned is prepared.

A plurality of LED chips 110 are mounted on the printed circuit board 90 in a COB method. However, the disclosure is not limited thereto, and the auxiliary light conversion layer 160 may be patterned after the plurality of LED chips 110 are mounted on the printed circuit board 90.

A transparent resin 120 is dispensed to each of the plurality of LED chips 110 to form a plurality of transparent resins 120 surrounding the plurality of LED chips 110, respectively.

A light conversion layer 130 is dispensed on each of the plurality of transparent resins 120 to form a plurality of light conversion layers 130 surrounding the plurality of transparent resins 120, respectively.

A barrier layer 140' is bonded to the printed circuit board 90 such that the barrier layer 140' substantially surrounds each of the plurality of light conversion layers 130.

Hereinafter, a display device 1 according to various embodiments will be described. Configurations other than a light conversion layer 130' and a barrier layer 140' described below are the same as or similar to those of the display device 1 according to embodiments described above, and thus the same descriptions may not be repeated.

Figure 9:
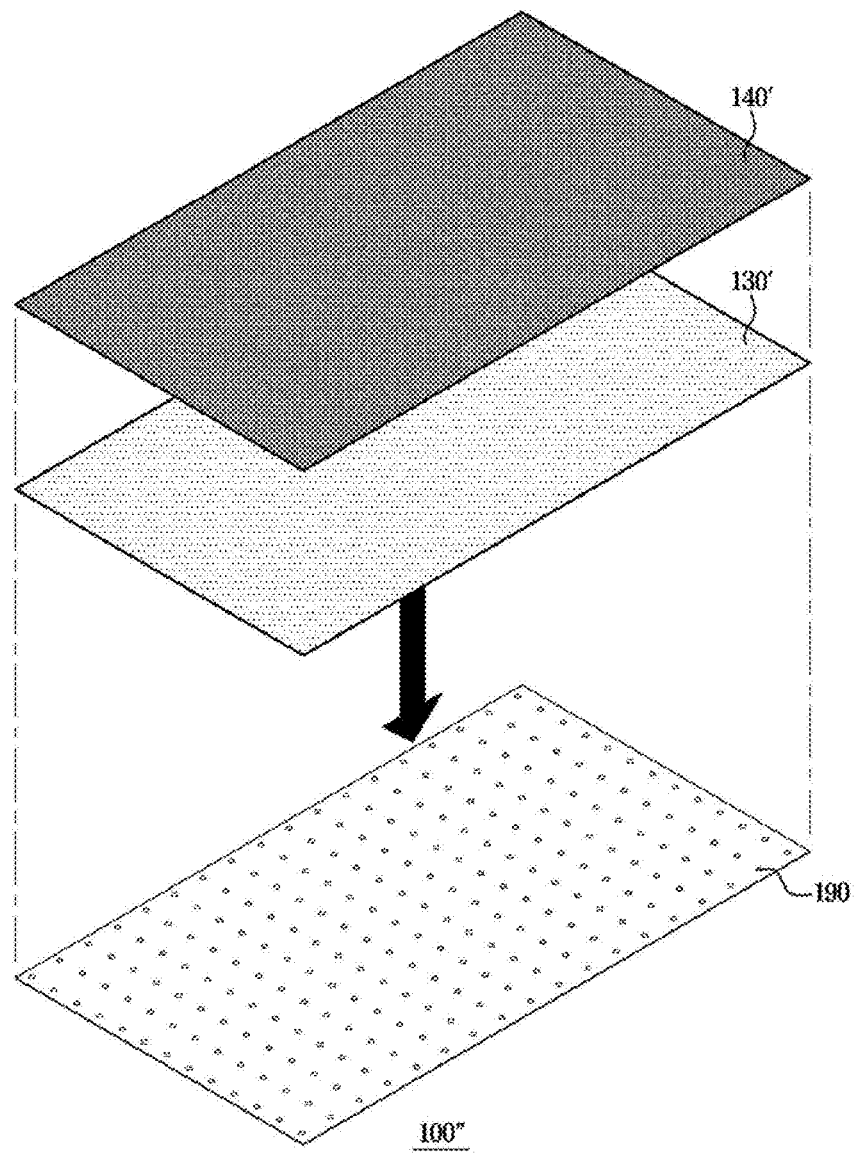
FIG. 9 is an exploded perspective view illustrating an example partial configuration of a light source plate of a display device according to various embodiments.
Figure 10:
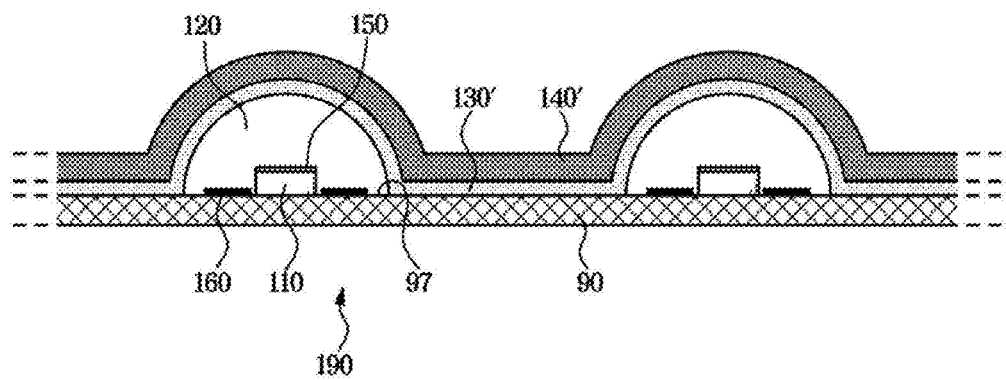
FIG. 10 is a cross-sectional view illustrating an example partial configuration of a light source plate of a display device according to various embodiments.

FIG. 9 is an exploded perspective view illustrating a partial configuration of a light source plate of a display device according to various embodiments. FIG. 10 is an enlarged cross-sectional view illustrating a partial configuration of a light source plate of a display device according to various embodiments.

Referring to FIGS. 9 and 10, a light conversion layer 130' and a barrier layer 140' may have sizes corresponding to the size of a printed circuit board 90.

The light conversion layer 130' and the barrier layer 140' may be bonded to each other in an overlapping manner A bonding layer of the light conversion layer 130' and the barrier layer 140' may be formed to substantially surround a plurality of transparent resins 120 through a bonding to a printed circuit board 90 in a direction in which a mounting surface 97 of the printed circuit board 90 faces.

However, the disclosure is not limited thereto, and after the light conversion layer 130' is first bonded to the printed circuit board 90, the barrier layer 140' may be bonded to the light conversion layer 130'.

For example, in the case of the light source plate 100 of the display device 1 according to an embodiment of the disclosure, the plurality of covers 170 individually covering the plurality of LED chips 110 include the plurality of transparent resins 120, the plurality of light conversion layers 130, and the plurality of barrier layers 140.

However, in the case of a light source plate 100" of the display device 1 according to an embodiment of the disclosure, a plurality of covers 190 individually covering the plurality of LED chips 110 include a plurality of transparent resins 120, and the plurality of covers 190 may be covered by a single light conversion layer 130' and a single barrier layer 140'.

Hereinafter, an example method of manufacturing the display device 1 according to an embodiment of the disclosure will be described in brief.

A printed circuit board 90 on which an auxiliary light conversion layer 160 is patterned is prepared.

A plurality of LED chips 110 are mounted on the printed circuit board 90 in a COB method. However, the disclosure is not limited thereto, and the auxiliary light conversion layer 160 may be patterned after the plurality of LED chips 110 are mounted on the printed circuit board 90.

A transparent resin 120 is dispensed to each of the plurality of LED chips 110 to form a plurality of transparent resins 120 surrounding the plurality of LED chips 110, respectively.

A light conversion layer 130' and a barrier layer 140' are bonded to each other.

The light conversion layer 130' and the barrier layer 140' bonded to each other are bonded to the printed circuit board 90 so that the light conversion layer 130' substantially surrounds each of the plurality of transparent resins 120.

However, the disclosure is not limited thereto, and the light conversion layer 130' may be first bonded to the printed circuit board 90, and then the barrier layer 140' may be bonded to the light conversion layer 130'.

Although few embodiments of the disclosure have been shown and described, the above example embodiments are for illustrative purposes, and it will be appreciated by those skilled in the art that changes and modifications may be made in these example embodiments without departing from the principles and scope of the disclosure, including the appended claims and their equivalents. It will also be understood that any of the embodiment(s) described herein may be used in conjunction with any other embodiment(s) described herein.

What is claimed is:

1. A display device comprising:
   a liquid crystal panel; and
   a light source plate disposed behind the liquid crystal panel configured to provide the liquid crystal panel with light,
   wherein the light source plate includes:
      a printed circuit board (PCB) having a mounting surface;
      a light emitting diode (LED) chip mounted on the mounting surface;
      a transparent resin disposed on the LED chip to substantially surround the LED chip;
      a light conversion layer configured to convert a wavelength of light emitted from the LED chip, the light conversion layer substantially surrounding an outer surface of the transparent resin;
      a barrier layer covering the light conversion layer from an outside; and
      an auxiliary light conversion layer disposed on the mounting surface adjacent to the LED chip, wherein a portion of the auxiliary light conversion layer above the mounting surface is substantially surrounded by the transparent resin and the auxiliary light conversion layer is configured to convert a wavelength of light emitted from the LED chip.

2. The display device of claim 1, wherein the light conversion layer includes quantum dot particles configured to convert a wavelength of light emitted from the LED chip.

3. The display device of claim 2, wherein the LED chip is configured to emit blue-based light,
   wherein the light conversion layer includes a red quantum dot configured to convert blue-based light into red-based light and a green quantum dots configured to convert blue-based light into green-based light.

4. The display device of claim 1, wherein the transparent resin has a dome shape formed on the mounting surface and having the LED chip disposed therein.

5. The display device of claim 4, wherein the LED chip includes a light emitting surface on a side that the liquid crystal panel faces, and is configured to emit light, and
   a region of an outer circumferential surface of the transparent resin provided at a position corresponding to the light emitting surface in a direction the light emitting surface faces is spaced apart from the light emitting surface.

6. The display device of claim 5, wherein the light source plate further includes a Distributed Bragg reflector (DBR) layer disposed on the light emitting surface configured to provide a greater light directivity angle with respect to the liquid crystal panel to light emitted from the light emitting surface.

7. The display device of claim 1, wherein the light source plate further includes:
   a plurality of auxiliary light conversion layers disposed on the mounting surface inside the transparent resin and different sides of the LED chip, and wherein the plurality of auxiliary light conversion layers are configured to convert a wavelength of light emitted from the LED chip.

8. The display device of claim 1, wherein the auxiliary light conversion layer includes a fluorescent material.

9. The display device of claim 8, wherein the LED chip is configured to emit blue-based light,
   and the fluorescent material is configured to convert blue-based light into red and green-based light.

10. The display device of claim 1, wherein the auxiliary light conversion layer is coated on the mounting surface.

11. The display device of claim 1, wherein the LED chip is directly mounted on the mounting surface as a Chip On Board (COB).

12. The display device of claim 1, wherein the light conversion layer is disposed on and substantially surrounds the transparent resin.

13. The display device of claim 12, wherein the barrier layer has a size corresponding to a size of the printed circuit board, and substantially surrounds the light conversion layer in a direction in which the mounting surface of the printed circuit board faces.

14. The display device of claim 1, wherein the barrier layer has a size corresponding to a size of the printed circuit board, and substantially surrounds the transparent resin in a direction in which the mounting surface of the printed circuit board faces.

15. The display device of claim 1, wherein the light conversion layer and the barrier layer each have a size corresponding to a size of the printed circuit board, and at least partially overlap and match with each other in a direction in which the mounting surface of the printed circuit board faces, and are bonded to the printed circuit bound in a direction in which the mounting surface of the printed circuit board faces.

16. The display device of claim 1, wherein the auxiliary light conversion layer is configured to convert the wavelength of light emitted from the LED chip into a mixed light and the mixed light reflected from the auxiliary light conversion layer passes through the transparent resin and the light conversion layer.

17. The display device of claim 1, wherein the a portion of the light emitted from the LED chip is incident onto the light conversion layer in a state of being pre-converted by the auxiliary light conversion layer.

18. A display device comprising:
a liquid crystal panel; and
a light source plate disposed behind at least the liquid crystal panel and configured to provide the liquid crystal panel with light,
wherein the light source plate includes:
  a printed circuit board (PCB) comprising a mounting surface;
  a light emitting diode (LED) chip;
  a transparent resin disposed on at least the LED chip to substantially surround the LED chip;
  a light conversion layer configured to convert a wavelength of light emitted from the LED chip, the light conversion layer substantially surrounding an outer surface of the transparent resin;
  a barrier layer covering the light conversion layer from an outside; and
  an auxiliary light conversion layer at least partially inside the transparent resin and configured to convert a wavelength of light emitted from the LED chip, and
wherein the device is configured so that light reflected from the auxiliary light conversion layer is to pass through the transparent resin and then pass through the light conversion layer.

* * * * *